July 4, 1939.  H. W. HEY  2,164,990
GEAR SHIFTING MECHANISM FOR MOTOR VEHICLES
Filed Oct. 5, 1936  2 Sheets—Sheet 1
Fig. 1.
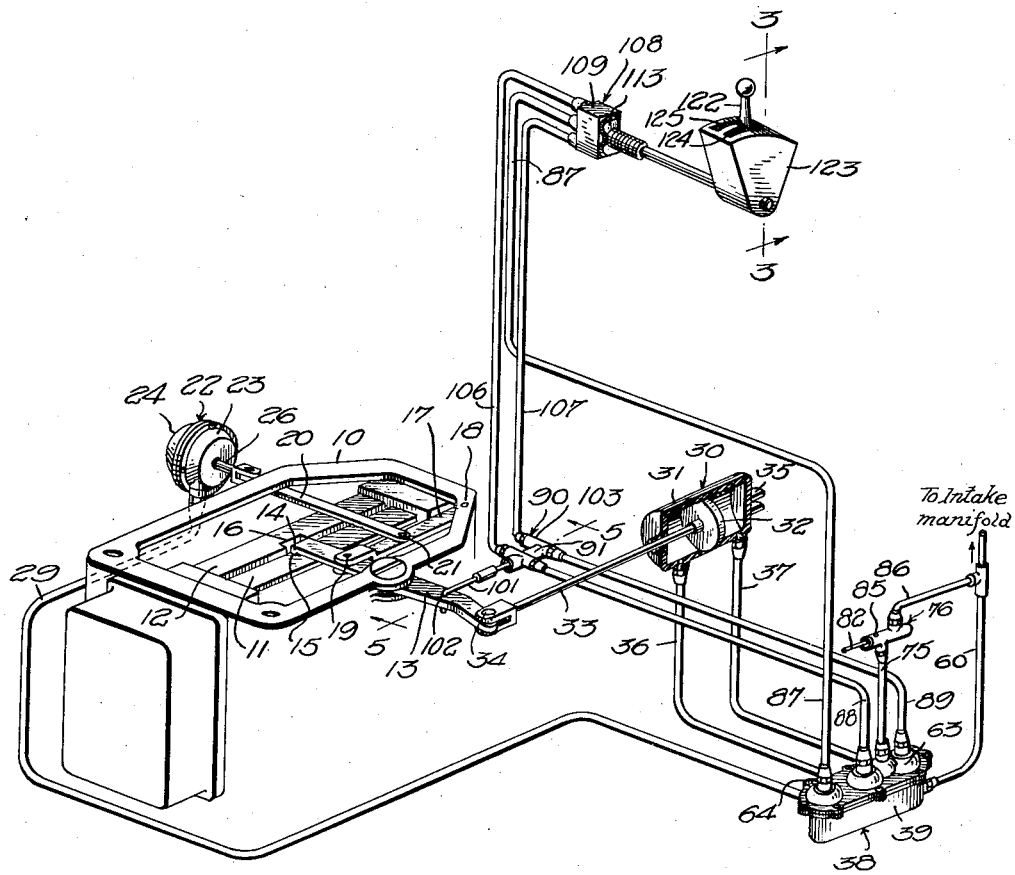
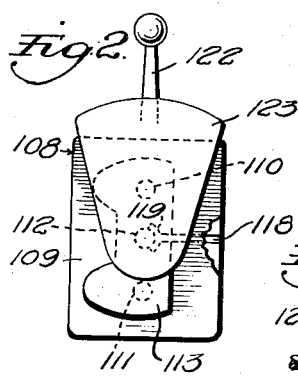
Fig. 2.
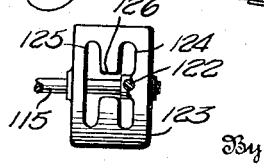
Fig. 4.
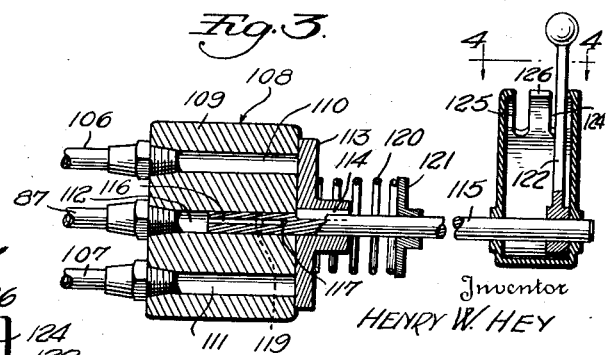
Fig. 3.
Inventor
HENRY W. HEY
By C. L. Parker
Attorney

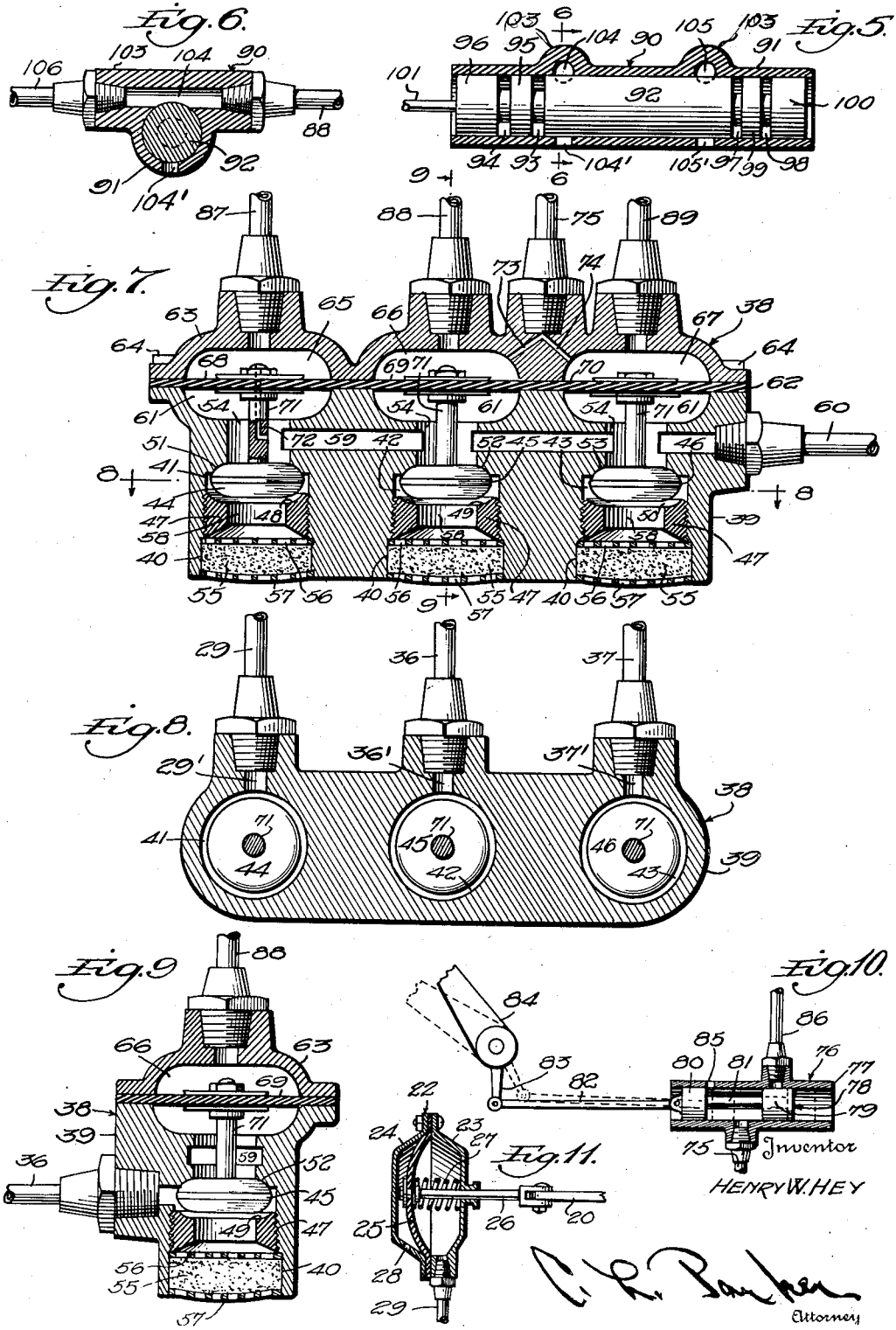

Patented July 4, 1939

2,164,990

UNITED STATES PATENT OFFICE 2,164,990

GEAR SHIFTING MECHANISM FOR MOTOR VEHICLES

Henry W. Hey, Richmond, Va., assignor to Automatic Shifters, Inc., Richmond, Va., a corporation of Virginia Application October 5, 1936, Serial No. 104,139

17 Claims. (Cl. 74—334)

This invention relates to gear shifting mechanisms for motor vehicles.

In the prior patent of Edward G. Hill and Henry W. Hey, No. 2,030,838, granted February 11, 1936, there is disclosed a gear shifting mechanism for motor vehicles wherein a main valve mechanism is effective for energizing the two motors which control the shifting action. A selector valve mechanism is manually operable for controlling the main valves, whereby the shift is effected by a main shifting motor in accordance with the positioning of the shift parts by a crossover motor.

In the apparatus referred to, an auxiliary valve is operable incident to the shifting action to provide two results, namely, the maintenance of air at atmospheric pressure in both ends of the shifting motor when the gear set is in neutral position, and the maintenance of equally reduced pressures on opposite sides of the piston of the shifting motor when the piston is in a position corresponding to a gear position. The latter function provides the feature of "vacuum suspension" of the piston of the shifting motor by means of which extremely rapid movement out of each gear position is effected when a shift is being made into another gear position.

The auxiliary valve referred to is effective for providing the desired results when the apparatus is employed in connection with a so-called "square transmission", that is, a transmission in which the shift rods move the same distance from neutral position to place the gear set in any gear position. The auxiliary valve partakes of a corresponding equal distance of travel when the gear set is shifted for any gear ratio. In other types of transmissions, such as those in which synchronizing devices are employed in certain of the gears, the auxiliary valve of the apparatus of the patent referred to is not effective for providing vacuum suspension for any gear position due to the differences in the distances of travel of the shift rods. For example, in most synchronizing transmissions commonly employed in passenger vehicles, the gears for second and high speed ratio remain in constant mesh, and accordingly the second and high gear shift rod partakes of relatively shorter movement than the first and reverse gear shift rod, which must move a sufficient distance to bring the associated gears into mesh.

An important object of the present invention is to provide a fluid pressure operated gear shifting mechanism wherein the difference in the distances of travel of the shift rods is compensated for to provide vacuum suspension of the piston of the shifting motor in any gear position.

A further object is to provide an auxiliary control valve which readily may be designed to render it effective for providing vacuum suspension for the shifting motor piston regardless of the difference in the distances of travel of the transmission shift rods.

A further object is to provide a novel auxiliary control valve of the character referred to which has one set of ports for providing vacuum suspension of the shifting motor piston when one shift rod is actuated and a different set of ports for accomplishing the same result when the other shift rod is actuated.

A further object is to provide an auxiliary valve device of the character referred to which is also operative for maintaining atmospheric pressure on opposite sides of the piston of the shifting motor when the gear set is in neutral position.

Other objects and advantages of the invention will become apparent during the course of the following description.

In the drawings I have shown one embodiment of the invention. In this showing—

Figure 1 is a perspective view of a portion of a motor vehicle gear set showing the shifting apparatus associated therewith, Figure 2 is an end elevation of the selector valve mechanism, Figure 3 is a section on line 3—3 of Figure 1, Figure 4 is a section on line 4—4 of Figure 3, Figure 5 is a section through an auxiliary control valve taken on line 5—5 of Figure 1, Figure 6 is a transverse sectional view on line 6—6 of Figure 5, Figure 7 is a central vertical longitudinal sectional view through the main control valve mechanism, Figure 8 is a horizontal sectional view on line 8—8 of Figure 7, Figure 9 is a section on line 9—9 of Figure 7, Figure 10 is a sectional view through a clutch operated valve, and, Figure 11 is a detail sectional view through the crossover motor.

Referring to Figure 1 the numeral 10 designates the vehicle gear set, the transmission ratio of which is adapted to be selectively changed by actuating a pair of shift rods 11 and 12. The transmission is of the type wherein the second and high gear units are provided with synchronizing means, while the first and reverse gear elements are rendered operative by sliding the usual gears into mesh with each other. First and reverse gears are selected by operation of the shift rod 11, while second and high gears are selected by operation of the shift rod 12, it being apparent that because of the nature of the transmission, the shift rod 11 partakes of greater movement from neutral position than the shift rod 12, which moves only a sufficient distance to render operative the synchronizing clutches or similar elements.

The mechanical elements employed for actuating the selected shift rod may be of any desired type, for example, the type shown in the copending application of Edward D. Lasley, Serial No. 99,843, filed September 8, 1936. Such mechanism comprises a horizontal shifting lever 13, shown in the present instance as being supported by the transmission casing 12 and being provided at its inner end with a depending finger 14 for effecting the shifting operation. The lever 13 is longitudinally slidable to selectively engage the finger 14 in a notch 15 formed in the shift rod 11 or in a notch 16 formed in the shift rod 12. The lever 13 is adapted to swing about a vertical axis to transmit longitudinal movement to the selected shift rod 11 or 12.

A crossover lever 17 is pivotally supported at one end by the transmission casing as at 18, while the opposite end of this lever is forked and pivotally connected as at 19 to the lever 13. An operating link 20 is pivotally connected at its inner end as at 21 to the lever 17, and it will be apparent that the link 20 is adapted to swing the lever 17 about its pivot 18 to effect bodily movement of the lever 13 and thus place the shift finger 14 in either of the notches 15 or 16.

The link 20 extends through one wall of the casing and preferably has a sliding fit therewith. This link is adapted to be actuated by a crossover motor indicated as a whole by the numeral 22. This motor comprises a pair of casing sections 23 and 24 having a diaphragm 25 clamped at its edges therebetween. The diaphragm is connected by a stem 26 to the adjacent end of the link 20, and a spring 27 biases the link 20 toward the left as viewed in Figures 1 and 11 to tend to maintain the shifting finger 14 in the notch 16. The casing 24 is vented to the atmosphere as at 28, while the casing 23 is adapted to be connected to a source of partial vacuum through a pipe 29, in a manner to be described.

A shifting motor indicated as a whole by the numeral 30 is adapted to rock the lever 13 to effect the shifting action. This motor comprises a cylinder 31 having a piston 32 reciprocable therein, as shown in Figure 1. A piston rod 33 is connected at one end to the piston 32 and has its opposite end connected as at 34 to the lever 13. The motor cylinder 30 may be provided with supporting ears 35 by means of which the motor may be supported to swing incident to the swinging and bodily movement of the lever 13. The respective ends of the cylinder 31 are adapted to be connected by pipes 36 and 37 to the atmosphere or to a source of vacuum, in a manner to be described.

A main valve mechanism indicated as a whole by the numeral 38 is adapted to control the motors 22 and 30, and such valve mechanism may be of the type disclosed in the copending application of Edward D. Lasley, Serial No. 97,451, filed August 22, 1936. The main valve mechanism comprises a casing 39 having a plurality of openings 40 extending upwardly through the bottom thereof, and these openings terminate at their upper ends in valve chambers 41, 42 and 43 to receive valves 44, 45 and 46, respectively. A threaded plug 47 is arranged in each of the openings 40, and these plugs are respectively provided in their upper faces with valve seats 48, 49 and 50 engageable by the respective valves 44, 45 and 46 upon downward movement thereof. These valves also are movable upwardly for engagement respectively with valve seats 51, 52 and 53 formed at the lower ends of vertical passages 54 arranged in axial alignment with the openings 40. The valve casing 39 is provided with lateral passages 29', 36' and 37' communicating at their inner ends with the respective chambers 41, 42 and 43 and at their outer ends with the respective pipes 29, 36 and 37.

Below the associated plug 47, each opening 40 is provided with filtering material 55 retained between upper and lower perforated plates 56 and 57. Each plug 47 is provided with an axial opening 58 to admit air into the corresponding valve chamber when the associated valve is in its upper position and the filtering material prevents the entrance of dust or other foreign material into the valve chambers. These chambers communicate with a longitudinal passage 59 through the vertical passages 54, when the valves are in their lower positions, and the passage 59 is connected by a pipe 60 to the intake manifold of the motor vehicle.

The upper face of the valve body 39 is provided with a plurality of chambers 61 arranged in axial alignment with and communicating with the respective openings 54. A sheet of elastic material 62 is arranged over the top of the valve body and closes the chambers 61, as shown in Figure 7. A cap 63 is arranged over the flexible sheet 62 and is secured to the valve body by suitable screws 64. The cap 63 is provided in its lower face with a plurality of chambers 65, 66 and 67, corresponding in position to the respective chambers 61 and dividing the elastic sheet 62 into a plurality of diaphragms 68, 69 and 70. These diaphragms are respectively connected to the associated valves by stems 71, and the stem of the valve 44 is provided with a restricted passage 72, affording limited communication between the diaphragm chamber 65 and the vacuum passage 59.

The diaphragm chambers 66 and 67 also have restricted communication with the source of vacuum, but such communication is provided only when the vehicle clutch is disengaged, thus preventing the shifting of the gears prior to clutch disengagement, as will become apparent. The cap 63 is provided with a pair of restricted passages 73 and 74 communicating with each other at their upper ends and having their lower ends communicating respectively with the chambers 66 and 67. The upper ends of the passages 73 and 74 communicate with a pipe 75, leading to a clutch operated valve illustrated in Figure 10 and indicated as a whole by the numeral 76.

The valve 76 comprises a casing 77 having a valve 78 slidable therein and including a pair of heads 79 and 80 connected by a reduced shank 81. A link 82 is connected at one end to the valve 78 and at its opposite end to a depending arm 83 carried by the vehicle clutch pedal 84. The pipe 75 communicates with the interior of the valve casing 77, and when the clutch pedal 84 is in the clutch-engaged position shown in solid lines in Figure 10, the valve 78 also is arranged in the solid line position. Under such conditions, the pipe 75 communicates with the atmosphere through a port 85, formed in the valve casing 77. When the clutch is disengaged, the valve 78 moves to the dotted line position shown in Figure 10, in which case the valve head 80 closes communication between the pipe 75 and port 85, while the valve head 79 moves to open communication between the pipe 75 and a pipe 86, leading to the vacuum pipe 60, as shown in Figure 1. Accordingly, it will be apparent that the diaphragm chambers 66 and 67, are open to the atmosphere through the clutch valve port 85 when the clutch is in engagement, and that the diaphragm chambers communicate with the intake manifold when the clutch is disengaged.

Pressure control pipes 87, 88 and 89 (Figure 7) communicate with the respective diaphragm chambers 65, 66 and 67. The pipes 88 and 89 lead to a valve mechanism indicated as a whole by the numeral 90 and shown in detail in Figures 5 and 6. Such valve mechanism includes a tubular valve casing 91 in which is slidable a valve 92. This valve is provided adjacent one end with a pair of annular grooves 93 and 94 having an interposed land 95 and an outer head portion 96. The other end of the valve is similarly provided with a pair of annular grooves 97 and 98 having an interposed land 99 and a head 100. An operating stem 101 is connected at one end to the valve head 96 and at its opposite end this valve stem has a pivotal connection as at 102 with the lever 13. Accordingly it will be apparent that the valve 92 is actuated by the swinging of the lever 13.

The valve casing 91 has a pair of transverse extensions 103 formed integral therewith and provided respectively with drilled passages 104 and 105. The valve casing 91 is provided with atmospheric ports 104' and 105' lying respectively in planes transverse to the axis of the valve 92 and passing through the passages 104 and 105.

As previously stated, one end of the pipes 88 and 89 have communication with the respective diaphragm chambers 66 and 67. The other ends of these pipes are connected to the respective passages 104 and 105 at one end thereof. The other ends of the passages 104 and 105 are connected to pipes 106 and 107 leading to a selector valve mechanism to be described. The pipe 87 which communicates with the diaphragm chamber 65, also leads to such selector valve mechanism.

In Figure 1, the selector valve mechanism has been shown with relation to the system as a whole, and such mechanism has been shown in detail in Figures 2, 3 and 4. The selector valve is indicated as a whole by the numeral 108 and comprises a valve casing 109 having upper and lower passages 110 and 111 extending therethrough. As shown in Figure 3, the pipes 106 and 107 are connected to the respective passages 110 and 111. The valve casing 109 is also provided with a central passage 112 to which the pipe 87 is connected.

A valve 113 is operable against one end of the valve casing 109 to control the admission of air into the passages 110 and 111. This valve is splined as at 114 on a shaft 115, one end of which is slidable and rotatable in the passage 112. The inner end of the shaft 115 is provided with a passage 116 terminating within the shaft 115 in a radial port 117. This port normally occupies the position shown in Figure 3, and upon sliding movement of the shaft 115, as viewed in Figure 3, the port 117 may be brought into communication with an atmospheric port 118 formed in the valve casing 109. The inner end of the port 118 is arcuately enlarged as at 119 in order that this port may communicate with the port 117 in any turned position of the shaft 115, as will become apparent.

A coil spring 120 has one end engaging the valve 113 and its opposite end engaging a collar 121 mounted on the shaft 115. The spring 120 obviously retains the valve 113 on its seat and tends to move the shaft 115 toward the right as viewed in Figure 3.

A selector handle 122 is mounted on the shaft 115 within a segmental housing 123. This housing is provided in its upper arcuate face with a pair of parallel slots 124 and 125 connected centrally of their length by a transverse slot 126. It will be apparent that the selector handle 122 is adapted to move back and forth in the slot 124, and that it may be transferred through the slot 126 to the slot 125 for movement therein. The handle 122 corresponds to the gear shift lever of a motor vehicle and the relative positions which it assumes in the slots 124 and 125 correspond to the gear positions of the conventional gear shift lever.

The operation of the apparatus is as follows:

Assuming that the operator is ready to move the vehicle forwardly, and assuming that the clutch is disengaged, the selector handle 122 may be moved transversely through the slot 126 and then rearwardly in the slot 125, which operation places the gear set in low gear position, as will be described. The movement of the selector handle 122 through the slot 126 moves the shaft 115 toward the left as viewed in Figure 3, thus placing the port 117 (Figure 3) in communication with the atmospheric port 118. Thus air will be admitted into passage 112, through the pipe 87, and thus into the diaphragm chamber 65 (Figure 7). There is a constant fixed leakage between the chamber 65 and the vacuum passage 59, but the admission of air into the chamber 65 takes place at a rate greater than the rate of exhaustion of air from this chamber.

Accordingly atmospheric pressure will be established in the chamber 65, while the corresponding chamber 61 is maintained under constant vacuum due to its communication with the vacuum passage 59. Atmospheric pressure on the upper face of the diaphragm 68 moves this member downwardly, thus transferring the valve 44 from its upper seat 51 to its lower seat 48.

As previously stated, the valve chamber 41 communicates with the pipe 29 (Figure 8) and this pipe leads to the crossover motor casing 23. Accordingly air will be exhausted from the right hand side of the crossover motor, as viewed in Figures 1 and 11, and accordingly atmospheric pressure in the casing 24 will move the diaphragm to the right. This motion is transmitted to the link 20, crossover lever 17 and shift lever 13, the finger 14 thus being transferred from the notch 16 to the notch 15.

Rearward movement of the selector handle 122 in the slot 125 rocks the valve 113 in a counter-clockwise direction as viewed in Figure 2, thus opening the passage 110 to the atmosphere while maintaining the passage 111 closed to the atmosphere. Air admitted into the passage 110 flows through the pipe 106, auxiliary valve passage 104 (Figure 5) and pipe 88, to the diaphragm chamber 66, thus establishing atmospheric pressure in this chamber to effect downward movement of the diaphragm 69. Thus the valve 45 will be moved to its lower seat 49, and the chamber 42 will communicate with the vacuum passage 59. The chamber 42 (Figure 8) communicates through the pipe 36 with the rear end of the motor cylinder 31, attention being invited to the fact that the perspective view in Figure 1 is taken looking toward the forward end of the vehicle. Assuming that the operation of the selector handle 122 will have started with the vehicle in neutral position, the auxiliary valve 92 will have occupied the position shown in Figure 5 at the beginning of the shifting operation, both passages 104 and 105 being closed to the atmosphere. Thus it will be apparent that when the valve 45 drops to its lower position the rear end of the cylinder 31 will be connected to the source of vacuum, while the forward end of the cylinder will communicate with the atmosphere through the pipe 37, valve chamber 43 and the corresponding opening 40, the valve 46 remaining in its upper position due to the fact that the chamber 67 is disconnected from the atmosphere both at the passage 105 (Figure 5) and passage 111 (Figure 3). Atmospheric pressure in the forward end of the cylinder 31 will effect rearward movement of the piston 32, thus rocking the lever 13 to effect forward movement of the previously selected shift rod 11. This operation places the gear set in low gear as will be apparent.

The swinging motion of the lever 13 in the manner stated transmits motion through the stem 101 to the auxiliary valve 92, thus moving this valve to the left as viewed in Figure 5. Thus the port 104 will be maintained closed to the atmosphere at the auxiliary valve, but it will be recalled that this passage will have been opened to the atmosphere upon the previous movement of the selector handle to low gear position. The valve 92, when the gear set is being placed in high gear, will be moved to a position wherein the groove 97 opens the passage 105 to the atmosphere through port 105'. In the synchronizing transmission in connection with which the present invention is intended for use, the low gear shift rod 11 moves a greater distance than the second and high gear shift rod 12, and accordingly the valve 92 will be travelling rearwardly rapidly when the groove 97 reaches the passage 105, and since the shift rod 11 will not have reached its limit of movement, the port 97 will move past the passage 105 without having communicated therewith to a sufficient extent to affect the position of the main valve 46. The operation of the motor 30 will continue therefore until the shift rod 11 has reached the limit of its stroke, at which point the valve groove 98 (Figure 5) will afford communication between the port 105' and passage 105. Movement of the valve 92 will be arrested at this point, and air will flow through the passage 105, pipe 89 (Figure 1), and thus into the diaphragm chamber 67 (Figure 7) and atmospheric pressure will be established therein. The diaphragm 70 will move downwardly, whereupon the valve 46 will be transferred from the seat 53 to the seat 50. The chamber 43 thus will be connected to the intake manifold through passage 59, and since the chamber 43 communicates through the pipe 37 with the forward end of the motor cylinder 31, air will be exhausted from the forward end of this cylinder very promptly after the piston 32 reaches its rearward position with the gear set in low gear. The valve 45 will remain in its lower position due to the position of the selector valve 113, and accordingly the piston 32 will be "vacuum suspended" ready for immediate forward movement when the next shifting operation is to be effected.

The operator will accelerate the vehicle to the desired extent in low gear, whereupon the shift may be made into second gear. In order to shift into second gear, the operator will move the selector handle 122 forwardly from the rear end of the slot 125, transversely through the slot 126, and then forwardly in the slot 124. It will become apparent that the selector handle will be moved in the manner referred to after the clutch has been disengaged in the conventional manner, or the selection of intermediate gear may be made prior to clutch disengagement.

Assuming that selection of second gear will be made after the clutch is disengaged, the forward movement of the handle 122 from the rear end of the slot 125 rocks the valve 113 in a clockwise direction as viewed in Figures 1 and 2, thus closing the previously opened selector valve passage 110, the valve 113 assuming the position shown in Figures 2 and 3 when the selector handle reaches a position in alignment with the transverse slot 126. It will be recalled that when the parts were placed in low gear position, the valve 92 (Figure 5) will have been moved rearwardly, or to the left as viewed in Figure 5, and the groove 98 will have been in a position connecting the passage 105 to the atmosphere through the port 105'. At the same time, the passage 104 will have been closed to the atmosphere by the valve 92.

Accordingly it will be apparent that when the selector handle 122 reaches the intermediate position shown in Figure 2, the pipe 88 will be closed to the atmosphere both at the selector valve mechanism and at the auxiliary valve 90. Accordingly the diaphragm chamber 66 (Figure 7) will be disconnected from the atmosphere and air will be exhausted from this chamber through the port 73. Accordingly balanced pressure will be established on opposite sides of the diaphragm 69, and the valve 45 will move to its upper position in engagement with the seat 52. The function of biasing the valves upwardly will be referred to later. With the valve 45 in its upper position, the chamber 42 will be connected to the atmosphere through the bottom of the selector valve casing, and thus air will be admitted through pipe 36 into the rear end of the shifting motor cylinder 31.

Since the pipe 89 will be opened to the atmosphere through the valve groove 98 (Figure 5) under the conditions being considered, atmospheric pressure will be retained in the diaphragm chamber 67, and thus the valve 46 will remain on its lower seat 50, and accordingly vacuum will be retained in the forward end of the cylinder 31. The differential pressure thus established on opposite sides of the piston 32 will effect forward movement thereof until the auxiliary valve 92 reaches the neutral position shown in Figure 5, at which time the valve 92 will close communication between the passage 105 and the atmosphere. The width of the land 99 and the speed of movement of the valve 92 are such that the land 99 will not sufficiently interrupt the admission of air into the passage 105 as to interfere with the operation of the piston 32, and the valve 92 will move to the position shown in Figure 5. With the selector valve in the position shown in Figure 2, therefore, the diaphragm chamber 67 will be cut off from the atmosphere and air will be exhausted from this chamber through the passage 74. With pressures equalized on opposite sides of the diaphragm 70, the valve 46 will move upwardly to engage its seat 53, thus connecting the valve chamber 43 to the atmosphere. Air will flow from this chamber through pipe 37 to the forward end of the cylinder 31, thus arresting movement of the piston 32 in neutral position.

Movement of the selector handle 122 transversely through the slot 126, preparatory to completing the selection of the intermediate gear, slides the shaft 115 (Figure 3) toward the right to close communication between the port 117 and the port 119. Thus the pipe 87 will be closed to the atmosphere, and air will be exhausted from the diaphragm chamber 65 through the valve stem port 72. Whereas the valve 44 will have been in engagement with its lower seat 48 when the vehicle was in low gear, the equalization of the pressures on opposite sides of the diaphragm 68 will result in movement of the valve 44 to its biased position in engagement with the seat 51. The chamber 41 thus will be connected to the atmosphere through the bottom of the valve casing, and air will be admitted through the chamber 41 and pipe 29 to the crossover motor casing 23 (Figure 11). Atmospheric pressure will now exist on opposite sides of the diaphragm 25, and the biasing spring 27 will effect movement of the link 20 to the left as viewed in Figures 1 and 11 to transfer the shift finger 14 to the notch 16 of the second and high speed shift rod 12.

Movement of the selector handle 122 forwardly in the slot 124 will now effect the shift into second gear. Bearing in mind that the selector valve 113 and the neutral valve 92 are in the respective positions shown in Figures 3 and 5 when the parts reach the neutral position referred to, it will be apparent that both diaphragm chambers 66 and 67 will be cut off from the atmosphere and the valves 44 and 45 will be in the positions shown in Figure 7. Movement of the selector handle 122 to the forward end of the slot 124 rocks the valve 113 in a clockwise direction as viewed in Figures 1 and 2, thus retaining the passage 110 closed and opening the passage 111 to admit air into the pipe 107, and thus through the auxiliary valve passage 105 and pipe 89 into the vacuum chamber 67. Atmospheric pressure above the diaphragm 70 will move the valve 46 to its lower seat 50, to connect the forward end of the cylinder 41 to the source of vacuum through pipe 37, valve chamber 43 and vacuum passage 59. The rear end of the cylinder 41 will remain connected to the atmosphere, and accordingly the piston 43 will move forwardly from its intermediate position. This action rocks the lever 13 and the transmission finger 14 will move rearwardly to actuate the shift rod 12 and thus effect the shift into second gear.

As previously stated, the present apparatus is particularly intended for use in transmissions having synchronizing means associated with the second and high gear elements of the transmission, and accordingly the shift rod 12 moves rearwardly a distance substantially less than the previously described shift rod 11, when the gear set was placed in low gear. When the shift is made into second gear, the piston 32 moves forwardly in the manner described, and similar movement will be transmitted to the auxiliary valve 92 through the link 101. When the shift rod 12 reaches second gear its movement will be mechanically arrested, as will be apparent, and accordingly the piston 32 will stop before it reaches the forward end of the cylinder 31. The valve groove 93 (Figure 5) is arranged so as to come into registration with the passage 104 when the transmission reaches second gear, and at such time, the passage 104 will be connected to the atmosphere through the valve groove 93 and atmospheric port 104'. While the selector valve passage 110 will be closed when the selector handle is in second gear position, air will now be admitted into the diaphragm chamber 66 through the passage 104 and pipe 88, whereupon the valve 45 will drop to its lower seat 49. This action connects the valve chamber 42 to the source of vacuum, and since this chamber communicates with the rear end of the cylinder 31, vacuum will be established therein to equalize the vacuum previously established forwardly of the piston 42 and accordingly this piston will be "vacuum suspended" with the gear set in second gear position.

The remaining functions of the apparatus, namely, the shifts into high gear and reverse, will be apparent from the foregoing description. The shift into high gear is made by moving the selector handle 122 rearwardly in the slot 124, under which conditions the shaft 115 (Figure 3), will be rocked without axial movement, and accordingly the crossover motor 22 will not be affected and the shift finger 14 will remain in engagement with the notch 16. When the parts of the apparatus reached second gear position, it will be recalled that the diaphragm chamber 67 communicated with the atmosphere through the selector valve pipe 111, while the diaphragm chamber 66 communicated with the atmosphere through passage 104, valve groove 93 and atmospheric port 104'. In the second gear position, therefore, the piston 32 will have been vacuum suspended, with both valves 45 and 46 in engagement with their lower seats.

When the handle 122 is moved to the high gear position at the rear end of the slot 124, the selector valve passage 111 will be closed and the passage 110 opened. Under such conditions, the diaphragm chamber 66 will now communicate with the atmosphere both through the auxiliary valve port 104' and through the selector valve passage 110, while the chamber 67 will be completely disconnected from the atmosphere since such communication was previously established in second gear only through the selector valve passage 111, which is now closed, in the high gear position of the selector handle 122.

With the chamber 67 cut off from the atmosphere, the valve 46 will be moved to its upper seat, thus connecting the forward end of the cylinder 31 to the atmosphere, and the piston 32 will move rearwardly. Under the conditions now being considered the movement of the piston 32 will not be arrested in neutral position, but will continue to move toward the rear end of the cylinder 31. It will be apparent that when neutral position is reached, the valve 92 (Figure 5) will assume the position shown in Figure 5 closing both atmospheric ports 104 and 105, but the selector valve passage 110 will remain open to the atmosphere, and the valve 45 will remain on its lower seat 49. Accordingly the piston 32 will continue its rearward movement until high gear position is reached. As previously stated the shift rod 12 moves a shorter distance in either direction from neutral than is true of the shift rod 11. When the high gear position is reached, movement of the shift rod 12, and consequently of the piston 32 and auxiliary valve 92, will be arrested. At such point, the valve groove 97 will stop in a position connecting the passage 105 (Figure 5) to the atmosphere through port 105' thus admitting air into the diaphragm chamber 67 to effect movement of the valve 46 to its lower seat 50. Thus in high gear, the diaphragm chamber 66 will be connected to the atmosphere through the selector valve passage 110, while the diaphragm chamber 67 will communicate with the atmosphere through the auxiliary valve port 105'. Both of the valves 45 and 46 accordingly will occupy their lower positions throughout the operation of the vehicle in high gear, thus vacuum suspending the piston 32 in such position.

The shift into reverse is made by moving the handle 122 transversely in the slot 126 and then forwardly in the slot 125. Under such conditions, the crossover motor will be operated in the same manner as for first gear, the shift finger 14 being engaged with the notch 15 of the shift rod 11. Forward movement of the selector handle in the slot 125 operates the shift motor 30 as for second gear, the piston 32 moving forwardly in the cylinder 31 and transmitting similar movement to the auxiliary valve 92.

When the shift is made into reverse, therefore, the auxiliary valve 92 (Figure 5) moves forwardly, or to the right as viewed in Figure 5, such direction of movement corresponding to the movement transmitted to this valve in the selection of second gear. The shift rod 11, however, is free to move a greater distance than the shift rod 12, which is actuated for second gear, and accordingly the movement of the parts will not be arrested with the valve groove 93 in alignment with the passage 104, when the shift is made into reverse. On the contrary, the movement of the parts will continue beyond such point, the piston 32 moving further forwardly than in second gear, and accordingly the valve groove 93 will move rapidly past the auxiliary valve passage 104.

As the groove 93 passes the passage 104, some air will be admitted into this passage from the atmospheric port 104, but the volume of air admitted into the passage 104 will be insufficient to affect the position of the diaphragm 69. When the reverse gear position is reached, however, the valve groove 94 will stop in alignment with the auxiliary valve passage 104, and air will be freely admitted through this passage into the diaphragm chamber 66 to drop the valve 45 to its lower seat 49. Accordingly the piston 32 also will be vacuum suspended when the gear set is in reverse gear. When the parts return from reverse to neutral position, the land 95 will not sufficiently prevent admission of air into the passage 104 to affect the operation of the parts, and the piston 32 and valve 92 will move to neutral positions before stopping.

In connection with the stopping of the parts in neutral position, it will be understood that the transmission shift rods are provided with the usual spring detent devices to insure the proper positioning of the shift rods in neutral position.

From the foregoing, it will be apparent that the present apparatus provides all of the desirable characteristics of operation of the apparatus disclosed in the patent to Edward G. Hill and Henry W. Hey, No. 2,030,838, previously referred to, and in addition, adapts the apparatus for use in the types of transmissions in which the shift rods move different distances. Thus, regardless of the distance of movement of the shift rods, the highly desirable characteristics of vacuum suspending the piston 32 in any gear position is provided. This operation, in practice, has been found to provide extremely rapid shifting, the movement out of a gear position in particular taking place with a far greater degree of rapidity than is possible if atmospheric pressure were present on opposite sides of the gear 32 in its different gear positions. Obviously, the various grooves of the auxiliary valve 92 may be placed wherever desired in the manufacture of this valve, so that a valve groove or similar means will admit air into any one of the other of the passages 105 at any gear position.

As previously stated the valves 44, 45 and 46 are biased to their upper positions when vacuum is present in the corresponding upper diaphragm chambers. In the copending application of Edward D. Lasley, Serial No. 97,451, filed August 22, 1936, referred to above, a valve mechanism corresponding to the main valve mechanism in Figure 7 is disclosed. In such pending application, one form of the mechanism shows that the use of springs for biasing the main valves upwardly may be eliminated. This elimination of springs is due to the fact that the valve stems occupy portions of the areas of the lower faces of the diaphragms 68, 69 and 70, while atmospheric pressure is always present against the lower faces of the valves with vacuum present above the valves. Without the use of springs, the main valves are all biased to their upper positions when the pressures are balanced in the respective upper and lower diaphragm chambers.

While the foregoing description of the various gear shifting operations assumes the vehicle clutch to have been disengaged prior to the shifting operation, it will be apparent that preselection may be practiced between any two respectively forward and rear positions of the selector handle 122. For example, preselection may be made between low gear and second gear positions, and the shifting of the gears between such positions will take place automatically upon the disengagement of the clutch. In other words, preselection may be accomplished between any two gear positions except between first and third gear positions and between second and reverse gear positions. This is due to the fact that between the pairs of positions referred to, a reversal of the movement of the piston 32 takes place after the crossover operation has been accomplished, which cannot be practiced with preselection with the apparatus as illustrated. This is not true of preselection between two positions which are respectively forward and rear positions, and preselection between any two such positions may be readily practiced.

In this connection it will be noted that when the clutch is in engagement, both diaphragm chambers 66 and 67 are definitely connected to the atmosphere through passages 73 and 74 (Figure 7), pipe 75 and port 85 (Figure 10), such communication with the atmosphere being unaffected by any operations of the selector handle 122. Upon disengagement of the clutch, however, the port 85 will be disconnected from the pipe 75 and the latter pipe will be connected to the vacuum pipe 86. Thus the diaphragm chambers 66 and 67 will have restricted communication with the intake manifold, and will be subject to control by the manual selector mechanism. Accordingly when preselection is practiced, both valves 44 and 45 will remain in their lower positions until the clutch has been disengaged, and will then function in accordance with the setting of the selector valve mechanism.

In describing the shifting action between first and second gears, such action has been described as taking place in three steps, namely, the shift to neutral position, the crossover action and then the shift into second gear position. Such mode of operation has been followed solely in the interest of clarity, and it will be apparent that the shifting action takes place so rapidly that the movement of the selector handle between any two gear positions may take place as rapidly as desired, the actual shifting operation being substantially continuous.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism for creating a differential pressure on opposite sides of said movable member, and means operative when the selected shifting member reaches a gear position, regardless of the distance of travel of such shifting member, for equalizing pressures on opposite sides of said movable member.

2. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism for creating a differential pressure on opposite sides of said movable member, and a valve movable upon the shifting of the selected shifting member and operative when the latter reaches a gear position, regardless of the distance of travel of such shifting member, for equalizing pressures on opposite sides of said movable member.

3. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism operative for connecting one end of said motor to a source of pressure differential to effect movement of the selected shifting member, and means operative when the selected shifting member reaches a gear position, regardless of the distance of travel of such shifting member, for connecting the other end of said motor to said source of pressure differential.

4. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism operative for connecting one end of said motor to a source of pressure differential to effect movement of the selected shifting member, and a valve movable upon the shifting of the selected shifting member and operative when the latter reaches a gear position, regardless of the distance of travel of such shifting member, for connecting the other end of said motor to said source of pressure differential.

5. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism operative for connecting one end of said motor to the atmosphere and the other end to a source of vacuum, and means operative when the selected shifting member reaches a gear position, regardless of the distance of travel of such shifting member, for connecting the first named end of said motor to the source of vacuum.

6. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism operative for connecting one end of said motor to the atmosphere and the other end to a source of vacuum, and an auxiliary valve movable upon the shifting of the selected shifting member and operative when such shifting member reaches a gear position, regardless of the distance of travel of such shifting member, for controlling said valve mechanism to connect the first named end of said motor to the source of vacuum.

7. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism for creating differential pressure on opposite sides of said movable member, and an auxiliary valve differentially operable in accordance with the distance of travel of the selected shifting member for effecting the balancing of the pressure on opposite sides of said pressure movable member when the selected shifting member reaches a gear position.

8. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism for creating differential pressure on opposite sides of said movable member, and an auxiliary mechanism differentially operative in accordance with the distance of travel of the selected shifting member and controlling said valve mechanism to balance the pressures on opposite sides of said movable member when the selected shifting member reaches a gear position.

9. A gear shifting mechanism for a motor vehicle having a transmission provided with a plurality of shifting members movable different distances to provide different gear ratios, comprising means for selecting said shifting members for actuation, a differential pressure motor having a pressure movable member for moving the selected shifting member, valve mechanism operative for connecting one end of said motor to the atmosphere and the other end to a source of vacuum, and an auxiliary valve mechanism differentially operable in accordance with the distance of travel of the selected shifting member for connecting the first named end of said motor to the source of vacuum when the selected shifting member reaches a gear position.

10. A gear shifting mechanism for a motor vehicle having a transmission provided with a plurality of shifting members movable different distances to provide different gear ratios, comprising means for selecting said shifting members for actuation, a differential pressure motor having a pressure movable member for actuating the selected shifting member, a pair of valves each of which is operable for connecting one end of said motor to a source of pressure differential, and means operative when the selected shifting member has moved to a gear position, regardless of the distance of travel of the selected shifting member, for actuating the other valve to balance the pressures on opposite sides of said movable member.

11. A gear shifting mechanism for a motor vehicle having a transmission provided with a plurality of shifting members movable different distances to provide different gear ratios, comprising means for selecting said shifting members for actuation, a differential pressure motor having a pressure movable member for actuating the selected shifting member, a pair of valves, manually operable means for effecting actuation of each valve to connect one end of said motor to a source of vacuum, and means operative when the selected shifting member has moved to a selected gear position, regardless of the distance of travel of such shifting member, for effecting actuation of the other valve to connect the other end of said motor to the source of vacuum.

12. A gear shifting mechanism for a motor vehicle having a transmission provided with a plurality of shifting members movable different distances to provide different gear ratios, comprising means for selecting said shifting members for actuation, a differential pressure motor having a pressure movable member for actuating the selected shifting member, a pair of valves, means for selecting one of said valves for actuation to connect one end of said motor to a source of vacuum, an auxiliary valve having a plurality of ports, each operative when one of said shifting members reaches a gear position and each connected to control one valve of said pair, and means for transmitting to said auxiliary valve a degree of movement corresponding to the movement of the selected shifting member for rendering one of said ports operative for effecting the actuation of the other of said first named valves to balance the pressures on opposite sides of said movable member.

13. A gear shifting mechanism for a motor vehicle having a transmission provided with a plurality of shifting members movable different distances to provide different gear ratios, comprising means for selecting said shifting members for actuation, a differential pressure motor for actuating the selected shifting member, a pair of valves for controlling said motor and each biased to one operative position, means for effecting movement of one of said valves to a second position to connect one end of said motor to a source of vacuum, an auxiliary control device connected to separately control the valves of said pair, and means for transmitting to said device a degree of movement corresponding to the movement of the selected shifting member whereby the other of said valves is moved to a second operative position connecting the other end of said motor to the source of vacuum, regardless of the distance of travel of the selected shifting member.

14. A gear shifting mechanism for a motor vehicle having a transmission provided with a plurality of shifting members movable different distances to provide different gear ratios, comprising means for selecting said shifting members for actuation, a differential pressure motor for actuating the selected shifting member, a pair of valves for controlling said motor and each biased to one operative position, fluid pressure means for effecting movement of each valve to a second operative position, each fluid pressure device including a pressure chamber, manually operable means for admitting atmospheric pressure into one of said chambers to move the corresponding valve and connect one end of said motor to a source of vacuum, a valve casing having a pair of passages communicating with the respective chambers, an auxiliary valve movable in said valve casing according to actuation of said shifting members and having a plurality of ports adapted to connect said passages to the atmosphere, at least two of said ports being adapted to communicate with one of said passages according to the degree of movement of the selected shifting member, and means for effecting movement of said auxiliary valve to a degree corresponding to the movement of the selected shifting member for connecting one of said ports to the passage which communicates with the other of said chambers to result in connecting the other end of said motor to the source of vacuum.

15. The combination with a motor vehicle transmission having a pair of shifting members each movable in opposite directions from neutral position to select a gear position and movable different distances into such positions, of means for selecting said shifting members for actuation, a differential pressure motor for actuating the selected shifting member, manually controllable valve mechanism for connecting one end of said motor to a source of pressure differential, and auxiliary control valve means connected to control said valve mechanism, said valve means being movable in accordance with the distance through which the selected shifting member is actuated and ported to control said valve mechanism to thereby effect connection of the other end of said shifting motor to the source of pressure differential when the selected shifting member reaches a gear position, regardless of the distance of travel of the selected shifting member.

16. The combination with a motor vehicle transmission having a pair of shifting members each movable in opposite directions from neutral position to select a gear position and movable different distances into such positions, of means for selecting said shifting members for actuation, a differential pressure motor for actuating the selected shifting member, a pair of control valves for connecting the respective ends of said motor to a source of pressure differential, a fluid pressure operated actuator for each valve including a pressure chamber, a conduit leading to each of said pressure chambers, manually operable means for admitting atmospheric air into one of said conduits to move one of said valves and connect one end of said motor to the source of pressure differential, and an auxiliary control valve movable in accordance with the distance through which the selected shifting member is actuated and ported to connect the other conduit to the atmosphere to effect connection of the other end of said motor to the source of pressure differential when the selected shifting member reaches a gear position, regardless of the distance of travel of the selected shifting member.

17. The combination with a motor vehicle transmission having a pair of shifting members each movable in opposite directions from neutral position to select a gear position and movable different distances into such positions, of means for selecting said shifting members for actuation, a differential pressure motor for actuating the selected shifting member, a pair of control valves for said motor, a fluid pressure operated actuator for each valve including a pressure chamber, a conduit connected to each chamber, a source of vacuum, a selector for opening one of said conduits to the atmosphere to effect actuation of one of said valves to connect one end of said motor to said source of vacuum, and an auxiliary control valve adapted to assume a plurality of operative positions in accordance with the degree and direction of movement of the selected shifting member, said auxiliary valve being provided with a plurality of ports one of which is operable when the selected shifting member reaches a gear position for admitting atmospheric air into the other conduit to actuate the other of said first named valves to connect the other end of said motor to said source of vacuum.

HENRY W. HEY.